Figure 1:
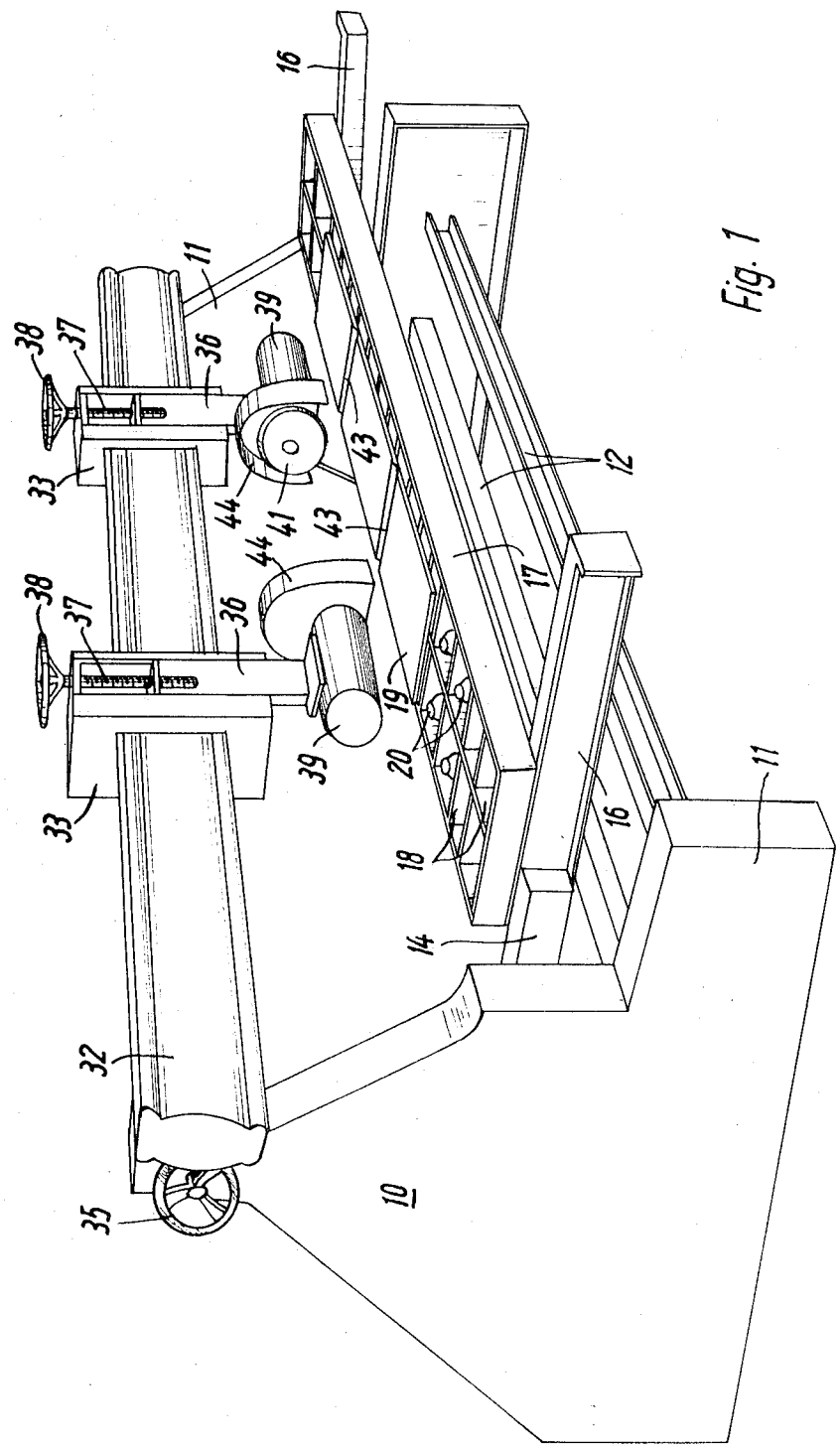

United States Patent

[11] 3,595,287

[72] Inventor Hermann Indermark
 Ahmser Strasse 6, 4901 Werl-Aspe, Lippe, Germany
[21] Appl. No. 772,968
[22] Filed Nov. 4, 1968
[45] Patented July 27, 1971

[54] METHOD AND MACHINE FOR MANUFACTURING A BODY OR FRAME AND A MACHINE FOR MAKING MITRE CUTS ON PANEL-LIKE WORKPIECES
7 Claims, 6 Drawing Figs.
[52] U.S. Cl. .................................................. 144/136,
 83/5, 83/422, 83/437, 144/315
[51] Int. Cl. ........................................................ B27f 5/02
[50] Field of Search........................................... 144/309,
 136, 315; 83/409, 422, 433, 437, 5; 90/58, 34, 34.1

[56] References Cited
UNITED STATES PATENTS

| 1,035,785 | 8/1912 | Hamilton..................... | 90/35 |
| 2,161,346 | 6/1939 | Goldstein..................... | 83/422 |
| 2,170,687 | 8/1939 | Johnson........................ | 144/136 |
| 2,803,869 | 8/1957 | Brauchler..................... | 83/5 |
| 3,058,868 | 10/1962 | Schroeder.................... | 156/258 |
| 3,060,812 | 10/1962 | Healy et al................... | 90/58 |
| 3,322,171 | 5/1967 | Cornell......................... | 144/136 |

Primary Examiner—Gerald A. Dost
Attorney—Polachek & Saulsbury

ABSTRACT: A method and machine for manufacturing a body for an article of furniture comprising the steps of coating one side of a panel with a finishing layer, cutting a plurality of mitre grooves on the other side, said grooves extending nearly through said panel, applying an adhesive to the cut surfaces of said grooves, bending said panel along the lines of said grooves to bring said cut surfaces together, and allowing said adhesive to set with the panel parts in their bent-up positions.

(I-I)

Inventor:
Hermann Indermark

Inventor:
Hermann Indermark
BY Polachek & Saulsbury
ATTORNEYS

METHOD AND MACHINE FOR MANUFACTURING A BODY OR FRAME AND A MACHINE FOR MAKING MITRE CUTS ON PANEL-LIKE WORKPIECES

This invention concerns a method of manufacturing furniture body or frame and a machine for making mitre cuts on panellike workpieces to be assembled into a furniture body.

A furniture body has hitherto been assembled from several individual panels (side and top panels) and the individual panels must be provided with mitre cuts to achieve neat joints. These mitre cuts have hitherto been executed mechanically or manually by means of saws or the like, each part of a piece of furniture having to be treated as a separate workpiece. These separate workpieces have to be cut to size, veneered and provided with drilled holes for the insertion of dowels for subsequent assembly in multiple operations. After the mitre or dovetail cuts have been made, the individual workpieces are assembled into a body and only then surface treated, as by the application of lacquer. All these operations demand a considerable amount of time. Furthermore, the mitre joints do not always exactly fit so that gaps may occur in the mitred joint area, or, in the grain of the veneers, a feature which causes the outer appearance to be defective. Thus previous methods of manufacturing a furniture body have in some ways proved unsatisfactory.

It is the object of the present invention to provide a method of manufacturing an article of furniture which permits early finishing treatment of the panel, and which facilitates assembly; the invention also provides a machine for making mitre cuts wherein several neat and exactly fitting mitre cuts can be made in one operation on a furniture panel for incorporation in a furniture body, whilst avoiding previous disadvantages.

According to the invention, in a method of manufacturing a furniture body, a previously treated, lacquered panel, covered or veneered on one side, is provided at certain spaced intervals on the other side with parallel mitre cuts in such manner that these cuts do not extend right through, leaving a thin layer, such as a veneer layer or a layer of plastics material. The panel is then provided in the region of the mitre cuts with an adhesive, and the resultant connected panel members are bent at angles relatively to each other.

In a preferred embodiment, before the production of the mitre cuts, reinforcing layers, preferably self-adhesive foils or the like, are applied to the opposed surface areas.

In accordance with another aspect of the invention, a machine for making mitre cuts, has several horizontally and vertically adjustable tools provided above a worktable receiving the workpieces to be cut. Preferably side milling cutters having relatively inclined cutting faces are used.

The tools are arranged in alignment with each other transversely to the direction of movement of the workpieces on an individually driven shaft, whilst the driving devices carrying the tools are located adjustably on vertical slides.

The vertical slides are each displaceably mounted in a tool slide which is horizontally adjustable along a horizontal upper main beam, and the horizontal and vertical movements of the vertical slides and tools slides are made by means of threaded spindles. The upper beam may be rigidly or displaceably mounted on the upper part of the machine frame.

In a preferred embodiment, the worktable is pneumatically or hydraulically driven, and is mounted so as to move below the said tools, the worktable being adjustable preferably by cylinders having a double action. The cylinders mounted below the worktable may be provided to swing in a bearing housing, and the piston rods thereof each have a point of attachment to the worktable.

The worktable is displaceable by means of lateral running rails and interposed sliding or rolling members on lateral bearing rails rigidly connected to the machine frame. To ensure correct rectilinear displacement of the worktable, racks mounted on the bearing housing may be provided, in which gearwheels or pinions cooperating with the worktable engage. Below the worktable one or more supporting rollers receiving the work pressure load may be arranged, which rollers run on guide rails and are displaceable with the worktable.

In another preferred embodiment the worktable is provided with a gridlike receiving surface for the workpieces, within which securing devices, such as vacuum suction plates or cups are provided for securing workpieces.

The present invention concerns a method and apparatus for the manufacture of a furniture body which comprises an initially surface treated panel which can be cut to shape, veneered, lacquered and polished and after the mitre cuts are made, is shaped in one operation into a furniture body. The mitre cuts do not extend completely through the entire panel so that the panel, divided by the mitre cuts into parts, has an inner cohesion in the case of veneered panels provided by the pasted-on reinforcing layers and, in the case of panels covered with plastics material, provided by the residual layer of plastics material. After the application of glue to the mitre cuts, the parts can be bent at angles to one another, to form the body of a piece of furniture, and rigidly pressed together. The machine of the present invention ensures accurately fitting mitre cuts in the process of manufacture, whereby an accurately made furniture body can be simply completed, the article presenting a neat and uninterrupted appearance, particularly at the corners.

The material near the mitre cuts is not severed, so that the grain of the veneer extends without interruption from one part to the next; no further surface treatment is necessary.

An adhesive dispenser may be attached to the worktable for treating the reinforcing layers.

Figure 2:
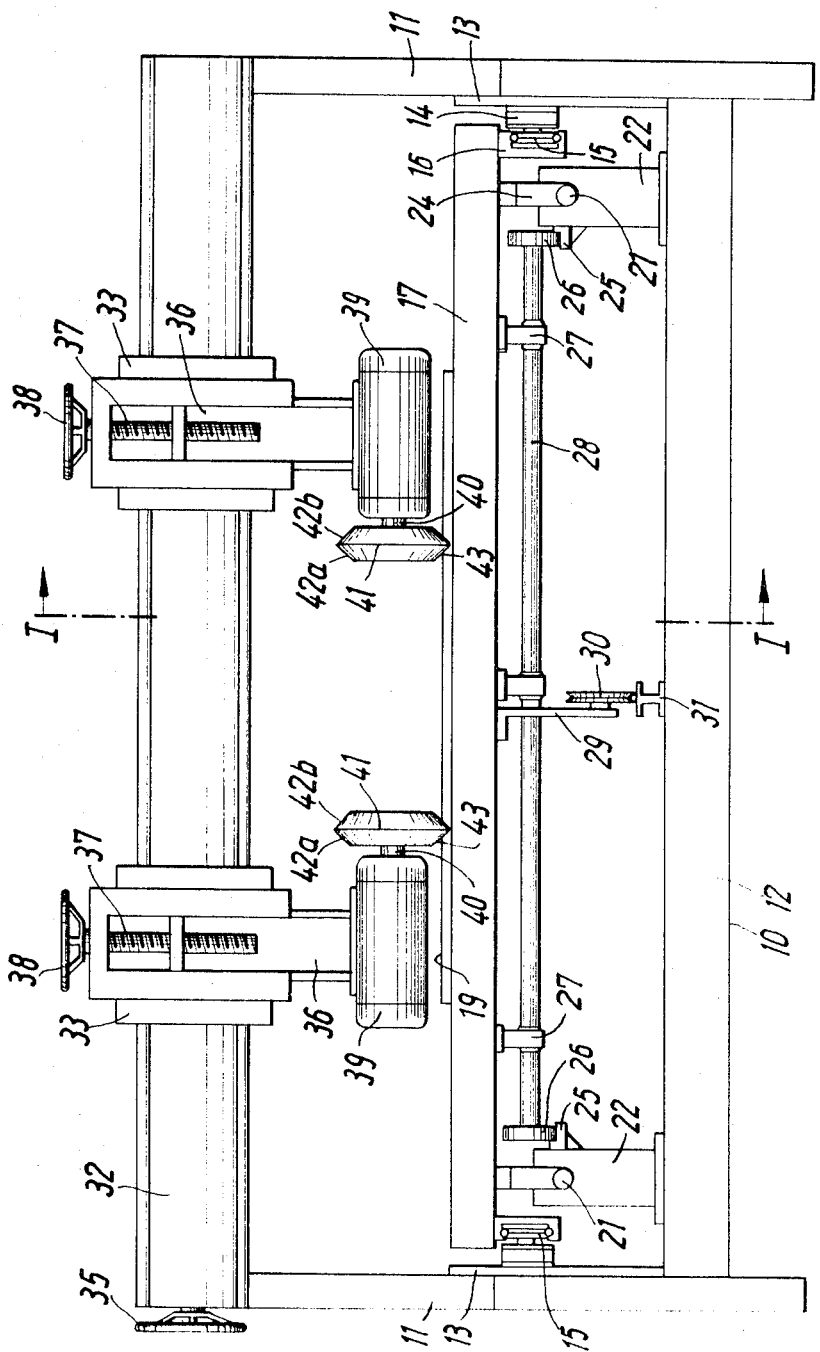
Figure 3:
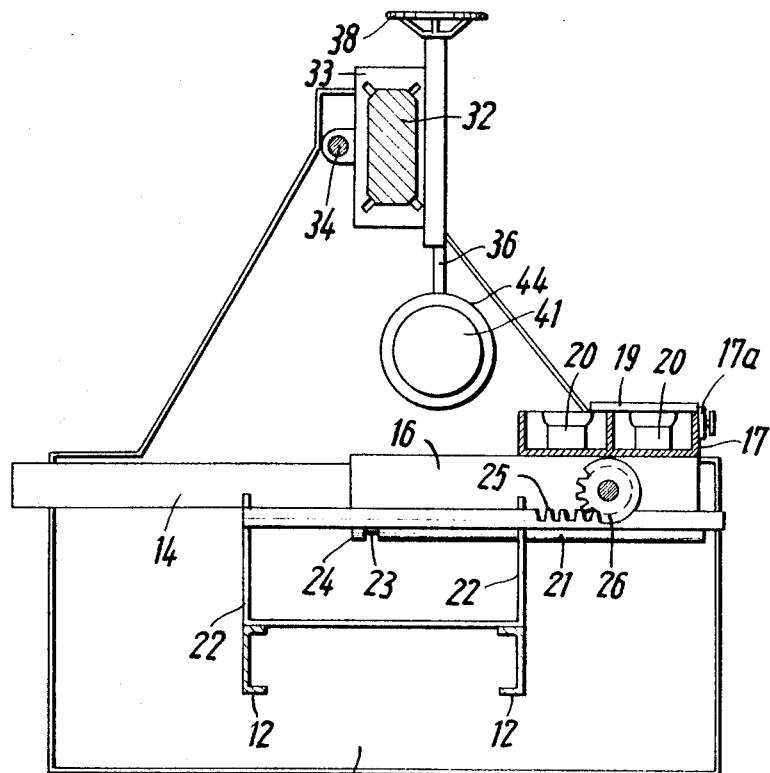
Figure 4:
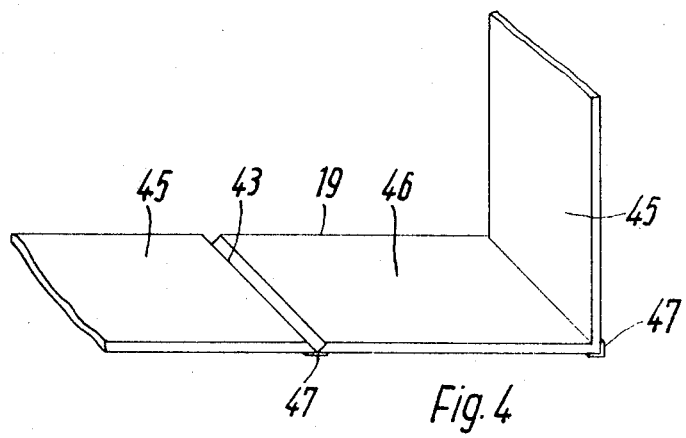
Figure 5:
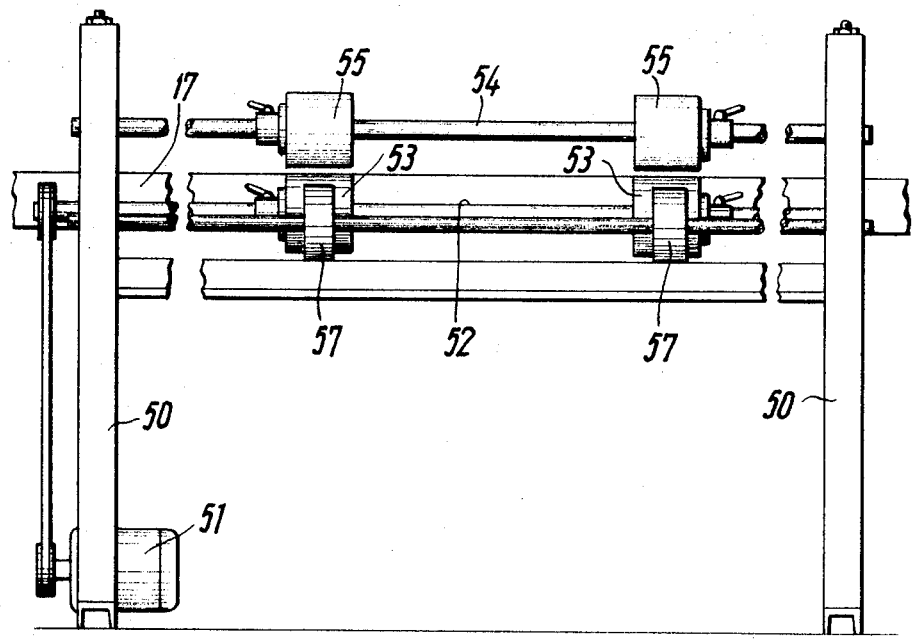
Figure 6:
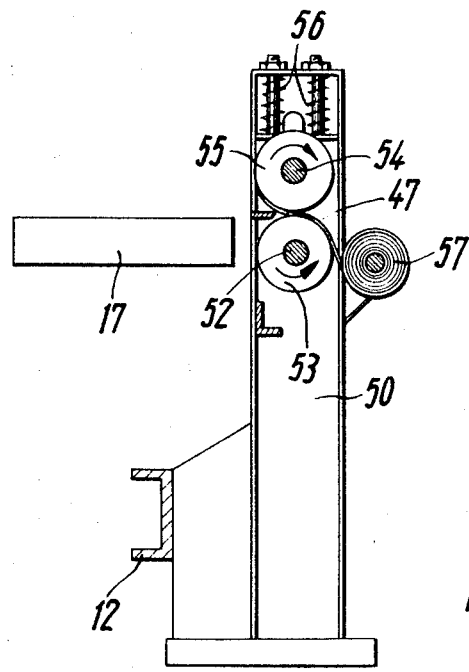

An embodiment of the present invention will be described hereinafter with reference to the accompanying drawings, in which:

FIG. 1 is a perspective view of a machine for producing mitre cuts on panel-shaped workpieces, FIG. 2 is a front view of the same machine, FIG. 3 is a longitudinal section through the same machine taken in line 1-1 of FIG. 2, FIG. 4 is a perspective view of a panel-shaped workpiece comprising formed mitre cuts and a turned up portion in the vicinity of a mitre cut, FIG. 5 is a front view of a device for glueing on reinforcing layers; and FIG. 6 is longitudinal section through the same device.

A machine for producing mitre cuts on panellike workpieces or the like comprises a frame 10 provided with two side supports 11 which are secured in their upright position by means of two parallel connecting beams 12, (FIG. 1).

Supported on these connecting beams 12, and on the opposed inner surfaces on the side supports 11 is a bracket 13 to which are fastened horizontal carrier rails 14. These carrier rails 14 are provided with one or more slide or roller members 15 (FIG. 2) on which a running rail 16 having a U-shaped cross section is mounted. The sides of the U-shaped running rail 16 assume a horizontal position and are disposed on the top and bottom of the slide or roller members 15 so that the running rails 16 are displaceable relatively to the carrier rails 14 in a horizontal plane and in the direction of movement of the workpieces 19 to be treated.

The running rails 16 support a worktable 17 arranged half way up the machine frame 10; the worktable 17 is rigidly mounted on the running rails 16 and is thus displaceable therewith in the direction of travel of the workpieces 19.

The worktable 17 has a rectangular box-shape with an open support surface for the workpieces 19. This support surface is formed of the longitudinal edges of upright partitions 18 which are arranged in grid form. Provided between these partitions 18 are several securing devices for the workpieces 19, which devices are shown as vacuum suction cups 20. These retain the workpieces on the worktable 17 by means of their suction. The front longitudinal edge of the worktable is provided with an adjustable stop 17a for the workpieces 19 (see FIG. 3).

The displacement of the worktable 17 is effected pneumatically or hydraulically by means of cylinders 21 engaging the worktable 17. These cylinders are mounted below the worktable 17 in lateral bearing housings 22 supported on the connecting supports 12.

A piston rod 23 of each double-acting cylinder 21, is rigidly connected to the worktable 17 by a pressure plate 24 so that, upon a movement of the piston rod 23, the worktable 17 is traversed in a horizontal plane.

To ensure uniform movement of the worktable 17, i.e. to avoid skewing of the worktable 17 due to different cylinder pressures, the bearing housings 22 are provided in their upper inner regions with racks 25 in which racks, gearwheels 26, cooperating with the worktable 17, engage.

Each rack 25 meshes with the gear wheel 26 and the two gearwheels 26 are fixed to opposite ends of a shaft 28 which rotates in bearings 27. When the worktable 17 is displaced, the gear wheels 26 mesh with the slide racks 25 and thus impart a uniform and equal movement to both ends of the table.

A collecting plate 29 is secured to the center area of the work table 17 and its underside and serves as a bearing point for a supporting roller 30 which rolls on a guide rail 31 corresponding to the path of the supporting roller 30. This supporting roller 30 (FIG. 2) keeps the worktable 17 lever over its entire width and receives any bending loads on the worktable 17 caused by the working pressure. Several such supporting rollers 30 may be provided according to the width of the worktable 17, so that said worktable 17 is always kept flat and thus accurate work can be carried out.

In the upper part of the machine frame, the side supports 11 carry an upper beam 32 extending parallel to the width of the worktable 17 and serving as a guide rail for receiving two tool slides 33, though more than these may be provided. A threaded spindle 34 which is journaled to rotate within the upper beam 32 and is fitted over a half of its length with a left-hand thread and over the other half with a right-hand thread, effects displacement of the tool slides 33 when the handwheel 35 is turned. A vertical slide 36 which is adjustable in height is displaceably journaled on each tool slide 33, said vertical slide being raised or lowered by means of a threaded spindle 37 and the upper hand wheel 38.

An electric motor 39, which serves as a tool carrier and which has a driving shaft 40 parallel to the longitudinal direction of the upper beam 32 and the worktable 17, is carried on the lower end of each vertical slide 36, (see FIGS. 1, 2, and 3).

The ends of the driving shafts extending out of the driving devices 39 are horizontally opposed and each carries an interchangeable precessing tool 41. This tool is preferably a milling cutter which has milling surfaces 42a, 42b with an angle of 90° between them. These milling cutters 41 execute mitre cuts 43 on the workpieces 19, each cut having a V-shaped cross section with an enclosed angle of 90°. Other mitre cut angles may also be effected by the use of suitably shaped alternative cutters. Other tools, for executing the same work, such as two disc saws inclined relatively to each other may be used instead of milling cutters.

A protective hood 44 is removably arranged around the tools 41 to prevent accidents. The upper beam 32 supporting the tool slide 33 may be rigidly or tiltably mounted in the side supports 11. The machine described produces mitre cuts 43 on panel-shaped workpieces 19. The workpieces 19 to be provided with parallel mitre cuts are laid on the worktable 17 and rigidly held in position by means of the vacuum suction plates 20. Then the spacing of the tools 41 is set by means of the threaded spindle 34 by turning the handwheel 35 and thus the spacing of the mitre cuts 43 on the workpiece 19. Then the height of the tools 41 is set by adjusting the vertical slides 36. This determines the depth of the mitre cuts 43.

The height adjustment of the tools 41 should preferably be such that the tools 41 leave approximately a few tenths of a millimeter of the workpiece uncut, so that the workpiece remains in one piece and is not divided.

The number of mitre cuts 43 is determined by the number of the tools 41 used. Once the tools 41 are set, they operate consistently on the introduced workpieces 19, without adjustment.

The workpieces 19 are each provided on one face with an outer layer, such as a veneer lacquer and are then cut to size.

The prepared face is laid on the worktable 17 and the upper face receives the mitre cuts 43. Before these cuts are made, the workpieces 19 are provided with a reinforcing layer 47, consisting of a self-adhesive foil applied to the prepared face in the region to be cut, this foil providing a reinforcement for the workpieces 19 during subsequent bending (FIG. 4). In the case of veneered furniture panels the mitre cuts are preferably taken completely through the panel so that the divided portions are held together only by the reinforcing layers; in the case of plastics-coated furniture panels, the mitre cuts are only partial and the panel parts remain connected together by their layer of plastics material.

The machine of the present invention makes it possible to produce a furniture body advantageously, since the workpieces 19 can be formed into a furniture body after the mitre cuts 43 are made.

The workpiece 19, shown in FIG. 4 is provided with mitre cuts 43 so as to divide it into three parts, connected together by a remaining outer layer (plastics layer or reinforcing layer), there being two side parts 45 and a cover part 46; these three parts 45, 46 are folded together to form a furniture body.

After the workpiece 19—the finished furniture panel—has passed through the machine of the present invention, an adhesive, such as glue is manually or mechanically applied to the mitre cuts 43; the two side parts are then raised perpendicularly (turned up at an angle) and the glue sets to form a furniture body in an associated press. The reinforcing layer 47 prevents tearing or damage of the finished outer surface, in the region of the mitre cuts when the side part 45 are turned up, since only a thin layer of material remains behind and this layer could be damaged during the bending operations. The said layer may be subsequently removed.

With the present invention the production of a furniture body is greatly simplified by the use of a method which, in a simple and time saving manner produces a furniture body from a furniture panel capable of being subsequently formed into the side parts and the cover. The panel concerned can be cut to size, veneered, lacquered and polished and placed in its initially treated state in the machine for producing mitre cuts, the reinforcing layer such as strips of adhesive foil, being already attached in the region of the mitre cuts.

Thus it is possible to utilize the veneers efficiently with the grain extending without interruption and the initial treatment can be carried out on plane surfaces in a simple manner.

Furthermore, by means of the machine of the present invention, exactly fitting mitre cuts, and thus, accurate assembly of the furniture body (frame) is achieved. Due to the initial treatment and the simplified working processes a time saving of approximately 30 percent is achieved in the manufacture of a furniture body from the raw material to the finished part, a feature which can reduce the cost of manufacture, and the selling price.

The machine of the present invention is of simple construction and easy to operate; and makes mass production of furniture frames possible.

The apparatus shown in FIGS. 5 and 6 of the drawings for the attachment of a reinforcing layer, preferably a self-adhesive plastic foil, is mounted ahead of the device for producing mitre cuts and forms one unit therewith.

An axle 52 which is driven by a driving device 51, carries several axially displaceable conveyor rollers 53, and is journaled in two lateral frame members 50 extending longitudinally of the side supports 11 at the level of the worktable 17. In the upper region of the frame, parallel to the axle 52, is a shaft 54 on which several axially displaceable pressure rollers 55 are rotatably mounted. These pressure rollers 55 are arranged to be adjustable in height in the frame members 50 together with the shaft 54, and are resiliently journaled relatively to the lower axle 52 by means of their adjusting devices 56.

Each of the conveyor rollers 53 is associated with an adhesive roll 57 which feeds a pressure and conveyor roller 55, 53 respectively with a self-adhesive plastic foil strip 47.

As they pass through this device the surfaces of the workpieces 19 opposite the situations of the mitre cuts 43 to be made subsequently, have a reinforcing layer 47 applied to them. The conveyor, pressure and adhesive rollers 53, 55, 57, are preset at the correct intervals apart corresponding to the mitre cuts 43, and as the workpieces 19 pass through, the reinforcing layer 47 is glued to the underside of the workpieces 19, the conveyor rollers 53 moving the workpieces 19 in the direction of travel (see arrow). The upper pressure rollers 55 urge the workpieces 19 firmly against the conveyor rollers 53 and thus against the reinforcing layer.

The apparatus of the present invention is simple to construct and reliable to operate. The reinforcing layers are mechanically glued on and the workpieces, such as furniture panels provided with the reinforcing layer in the region of the appropriate mitre cut, are automatically conveyed to the next operation.

I claim:

1. A mitre cuts-imparting machine comprising, in combination: at least two side supports spaced apart from each other; a beam mounted on and between elevated portions of said spaced side supports; reciprocatory table means having a panel-receivable upper face extending about between said side supports, with said upper face about parallel to said beam, and said table means being reciprocatory in directions about normal to said beam; a plurality of slide mechanisms adjustably mounted along said beam; rotary motor and mitre-cutting tool means mounted on each slide mechanism; elevation means for adjusting each of said motor and said tool means along its respective said slide mechanism toward and away from said upper face; a pair of parallel gearwheel-receiving racks bilaterally mounted parallel to reciprocatory movement of said reciprocatory directions; at least two gearwheels, one of said gearwheels engaging with and rideable on one of said racks and the other gearwheel engaging with and rideable on the other of said racks; a shaft extending between and operatively connected with said gearwheels; and shaft-support means for said shaft, mounted on said table means.

2. A machine according to claim 1 in which said elevation means includes manually actuateable screw means for moving said slide mechanisms along said beam; and including a lateral-adjustment manually actuateable screw means for moving said slide mechanisms along said beam.

3. A machine according to claim 1, further comprising: slide members, at least one of said slide members being mounted on at least one of said table means and one of said side supports adapted for sliding motion of said table means along said one side support in said reciprocatory directions, at least another of said slide members being mounted on at least one of said table means and the other of said side supports adapted for sliding motion of said table means along said other side support in said reciprocatory directions; sucker means mounted on said table means facing upwardly from said upper surface, adapted to secure by suction a panel in position thereon; double acting piston and cylinder means connected between said table means and at least one of said side supports, for imparting said reciprocatory movement; and supply means to supply pressurized fluid for and connected to said piston and cylinder means.

4. A machine for producing mitre cuts in panellike workpieces, more especially in panels which are provided with a cover layer at least on the side remote from the mitre cuts, and for producing furniture bodies, including two side supports interconnected by cross transverses and by a cross beam located in upper regions of said side supports and having sliding surfaces which slidably support at least two horizontally displaceable slides which are displaceable at right angles to the longitudinal direction of the mitre cuts to be produced; said horizontal slides each having a vertical slide mounted thereon, adjustable by means of a setting spindle, and supporting a mitre cutter with drive motor and a profile cutter rotatable about a horizontal axis for producing a V-shaped cut; and horizontally displaceable workpiece support means located with spacing below said mitre cutters for supporting the panels to be processed and containing a plurality of suction cups which act to hold the undersides of said panels to be mitre-cut against the support by suction.

5. A machine according to claim 4, in which said supports carry at least two horizontally displaceable slides which are displaceable in the extension of width of said machine; and in which said workpiece support means is supported on guide means which is located on said side supports and connected to a pressure medium cylinder and on the underside of said workpiece support has a gearwheel which meshes with a racked bar mounted on the machine frame.

6. A machine according to claim 5, in which said two horizontally displaceable slides are interconnected by a transversely extending threaded spindle which has a right-hand threaded portion receiving the horizontal slide and a left-hand threaded portion receiving the other horizontal slide.

7. A machine according to claim 6, in which said workpiece support means is supported with lateral guide tracks on rowlocks acting as guide means located on the side portions of the machine side supports; and including an apparatus for pasting self-adhesive reinforcing strips to the underside of the panel to be processed in the region of the mitre cut to be produced, said apparatus being located between and on the machine side supports in front of the workpiece support means, and an adhesive device provided for each mitre cutter, said adhesive device being laterally continuously adjustable in the machine width and having said adhesive reinforcing strip removably mounted therein.